(12) United States Patent
Grabarnik et al.

(10) Patent No.: US 8,301,613 B2
(45) Date of Patent: Oct. 30, 2012

(54) SYSTEM AND METHOD FOR INCIDENT PROCESSING THROUGH A CORRELATION MODEL

(75) Inventors: Genady Grabarnik, Scarsdale, NY (US); Gabriela P. Marcu, Neuried (DE); Larisa Shwartz, Scarsdale, NY (US); Christopher Ward, Glen Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 12/885,705

(22) Filed: Sep. 20, 2010

(65) Prior Publication Data
US 2011/0295898 A1    Dec. 1, 2011

Related U.S. Application Data

(60) Provisional application No. 61/349,399, filed on May 28, 2010.

(51) Int. Cl.
*G06F 17/30*  (2006.01)
(52) U.S. Cl. ....................................... 707/706; 707/707
(58) Field of Classification Search .................. None
See application file for complete search history.

(56) References Cited

U.S. PATENT DOCUMENTS

| | | | |
|---|---|---|---|
| 6,804,665 B2 | 10/2004 | Kreulen et al. | 707/3 |
| 6,829,734 B1 | 12/2004 | Kreulen et al. | 714/46 |
| 6,876,993 B2 | 4/2005 | LaButte et al. | 706/47 |
| 7,266,734 B2 * | 9/2007 | Chavez et al. | 714/48 |

OTHER PUBLICATIONS

A. Hanemann, "Automated IT Service Fault Diagnosis Based on Event Correlation Techniques",phD Theseis, university of Munich, Department of Computer Science, Munich, Germany, 2007.
J. Stanley et al., "Correlating Network Services with Operational Mission Impact", Proceedings of the IEEE Military Communciations Conference (MILCOM) pp. 162-168, Chicago, 2005.

(Continued)

*Primary Examiner* — Baoquoc N To
(74) *Attorney, Agent, or Firm* — Harrington & Smith

(57) ABSTRACT

Disclosed is a method, system and a computer program for correlating an incident service ticket with an incident resource ticket. The method includes, in response to a creation of an incident service ticket in a certain service category; searching with a data processor for open incident resource tickets of the same or similar category; searching with the data processor based on a set of similarity rules for corresponding critical configuration items defined in business service configuration items and, if both searches succeed, searching with the data processor found incident resource tickets ordered by time using found critical configuration items and, if a match is found, declaring the incident service ticket to be correlated with the matching incident resource ticket. The exemplary embodiments further provide that, if both searches do not succeed, or if a match is not found, obtaining input from a dependency tree for the business service configuration items and if no related service configuration items for the service category are identified then concluding the performance of the method, otherwise searching with the data processor found incident resource tickets ordered by time using found related service configuration items. If no associated resource tickets are available then the method performs constraint adaptive probing of resources determined from the dependency tree to attempt to generate at least one corresponding resource ticket, and to search on any corresponding resource tickets that are generated for related configuration items.

25 Claims, 8 Drawing Sheets

OTHER PUBLICATIONS

I. Rish et al., "Adaptive Diagnosis in Distributed Systems", IEEE Transactions on Neural Networks (special issue on Adaptive Learning Systems in Communication Networks), 16(5):1088-1109, 2005.
S. Symonenko et al., "Illuminating Trouble Tickets with Sublanguage Theory", Center for Natural Language Processing School of Information Studies, Syracuse University, Jun. 6, 2006.
I. Rish et al., "Real-Time Problem Determination in Distributed Systems Using Active Probing", Proceedings of the $9^{th}$ IFIP/IEEE International Management and Operations Symposium (NOMS), pp. 133-146, Seoul, Korea 2004).
A. Hanemann et al., "Algorithm Design and Application of Service-Oriented Even Correlation",Proeedings of the $3^{rd}$ IFIP/IEEE International Workshop on Business-DrivenIT Management (BDIM 2008).
B. Gruschke, "Integrated Event Management: Event Correlation Using Dependency Graphs" Proceedings of the $9^{th}$ IFIP/IEEE International Workshop on Distributed Systems: Operations & Management (DSOM 98).

* cited by examiner

```
1:  procedure INCIDENTTICKETCORRELATION
2:      initializeAllList        ▷ all lists needed are initialized
3:      newServiceTicket = getNewServiceTicket()
4:      listOfOpenRT = getListOfRT()
5:      listOfSimilRules = getSimilRules()
6:      servCategory = getservCategory()
7:      for each SimilRule in listOfSimilRules do
8:          ResIdentTree = getResourceIdentTree()
9:          listOfResIdentTree.add(ResIdentTree)
10:     end for
11:     for each RT in listOfOpenRT do
12:         RT category = getResIdentifier()
13:         for each resCategory in listOfResIdent do
14:             if RTcategory = resCategory then
15:                 listOfSimilRT.add(RT)
16:             end if
17:         end for
18:     end for
19:     BusServCI = getBusServCI(customerID)
20:     listOfCriticalCIs
    getCriticalCIs (BusServCI, servCategory)
21:         if notempty (listOfSimilarRT) and notempty
    (listOfCriticalCIs) then
22:             listofRTforCritCIs = findRTforCritCIs
23:             if noempty (listofRTforCritCIs) then
24:                 listOfCorrelRT = listofRTforCritCIs
25:             end if
26:         end if
27:         listOfRelatedCIs = findServiceRelCIs
28:         if notempty (listOfRelatedCIs) then
29:             listOfRTforRelCis = findRTforRelCIs
30:             listOfcorrelRT = listOfRTforRelCis
31:         else
32:             doCAP(listOfRelatedCIs)
33:         end if
34: return listOfCorrelRT
35: end procedure
```

FIG. 7

Greedy Constraint Adaptive Probing Algorithm
Input:
A set of probes T, dependency Matrix $D$, resource constraint $P$, time constraint $L$, prior partition $P$ of the service nodes N
Output:
A sequence $S = S_1, S_2, ..., S_k$ of subsets
of probes $S_i \subset T|$ with $|S_i| \leq P$ & $k \leq L$
Initialize:
$S \leftarrow \emptyset$
do
1. Select p most informative probes $T_{i_j},..., T_{i_p}$ s.t. $T_{i_j},..., T_{i_p}$ are $argmax H(P(S \cup P(T_{i_j},..., T_{i_p})|S))$
2. if probe $l_i$ returns *FAILED* then
$N \leftarrow N \cap BD(N(T_{l_1}))$ and $P \leftarrow P|_{BD(N(T_{l_1}))}$
3. $S \leftarrow S \cup \{T_{i_j},..., T_{i_p}\}$
while
$i \leq L$ & $\exists T \in T \setminus \bigcup_l S_l$ s.t.
$H(P(\vee_{l=1}^{i}\{BD(N(T_{l_1})),..., BD(N(T_{l_p}))\}))|$
$P(\vee_{l=1}^{i-1}\{BD(N(T_{l_1})),..., BD(N(T_{l_p}))\}) > 0$
return $S$

FIG. 8

SYSTEM AND METHOD FOR INCIDENT PROCESSING THROUGH A CORRELATION MODEL

CLAIM OF PRIORITY FROM COPENDING PROVISIONAL PATENT APPLICATION

This patent application claims priority under 35 U.S.C. §119(e) from Provisional Patent Application No. 61/349,399, filed May 28, 2010, the disclosure of which is incorporated by reference herein in its entirety.

TECHNICAL FIELD

The exemplary embodiments of this invention relate generally to information technology (IT) systems, methods and computer software and, more specifically, relate to the management of incidents and related incident tickets.

BACKGROUND

An information technology infrastructure library (ITIL) may be viewed as best practice in managing information technology infrastructure, development, and operations. An aspect of ITIL is IT incident management. In ITIL terminology an incident has been defined as: "An unplanned interruption to an IT service or reduction in the quality of an IT service. Failure of a configuration item that has not yet impacted service is also an incident". In general, incident management is a process which deals with incidents.

An incident management tool is one supported by an incident ticket system (ITS) which is a software system that runs in an organization and records as a ticket a malfunction and/or an affected service. A ticket is a record which contains information about the failure or malfunction, as well as information concerning support interventions made by technical support staff or third parties on behalf of an end user who has reported an incident. Tickets can be automatically issued by monitoring systems when they recognize a degradation of the IT system.

In such an ITS there can coexist different categories of tickets (e.g., from the end user or from the monitoring system) without any explicit relationship with each other. While information about failed or disrupted services and/or resources can co-exist, this information can be scattered over the system. One detrimental result is that the connection/relationship between a failed resource and a malfunctioning service cannot be realized automatically. While the connection may possibly be realized manually, in a system of any appreciable size the manual approach can be time consuming, expensive and inherently unreliable.

In general, Incident Management and Problem Management are two of the Service Operation processes in the ITIL. These two processes aim to recognize, log, isolate and correct errors which occur in the environment and disrupt the delivery of services. Incident Management and Problem Management form the basis of the tooling provided by the ITS.

There has been considerable research related to the correlation of trouble ticket/symptoms/events for Incident and Problem Management and fault diagnosis.

In Dreo, G., *A Framework for Supporting Fault Diagnosis in Integrated Network and Systems Management: Methodologies for the Correlation of Trouble Tickets and Access to Problem—Solving Expertise*. DISS, Ludwig—Maximilians—Universität München, 1995, there is a proposal to use trouble-ticket correlation for discovery of tickets and access to problem-solving expertise. Dreo argues that good models for the functional and topological (i.e., resource mapping) aspects of a service are key elements for high-quality correlation.

A. Hanemann, Automated IT Service Fault Management Based on Event Correlation Techniques. PhD thesis, University of Munich, Department of Computer Science, Munich, Germany, 2007, proposes an algorithm for event correlation, which was extended in A. Hanemann and P. Marcu, Algorithm Design and Application of Service—Oriented Event Correlation. *Proceedings of the 3rd IFIP/IEEE International Workshop on Business—Driven IT Management (BDIM 2008)*, Salvador Bahia, Brazil, 2008. The algorithm is based on the same service model as in B. Gruschke, Integrated Event Management Event Correlation Using Dependency Graphs. *Proceedings of the 9th IFIP/IEEE International Workshop on Distributed Systems: Operations & Management (DSOM 98)*, pages 130-141, Newark, Del., USA, 1998. Events are correlated for root-cause analysis using Rule-Based Reasoning (RBR) and active probing.

K. Chang and H. Carlisle and J. Cross and P. Raman, A self-improvement helpdesk service system using case-based reasoning techniques. *Computers in Industry*, pages 113-125, New York, 1996, proposes a system for self-improvement help desk service that uses Case-Based Reasoning (CBR). This techniques emphases the importance of searching through the descriptions of a ticket. E. Liddy and S. Rowe and S. Symonenko, Illuminating Trouble Tickets with Sublanguage Theory. *Proceedings of the Human Language Technology Conference of the North American Chapter of the ACL*, pages 165-172, New York, 2006, describes a similar approach using RBR techniques for discovering the historical and predictive value of trouble ticket data. Both these approaches use keyword search. However, the likelihood of incorrect correlation results is relatively high because, often, the highly relevant keywords are difficult to determine.

R. Gupta and K. Prasad and M Mohania, Automating ITSM Incident Management Process. *Proceedings of the 5th IEEE International Conference on Autonomic Computing*, pages 141-150, Chicago, 2008, proposes an automated algorithm for correlating an incoming incident with configuration items of the CMDB based on a keyword search of the CMDB.

Adaptive probing techniques (see, I. Rish and M. Brodie and S. Ma and N. Odintsova and A. Beygelzimer and G. Grabarnik and K. Hernandez. Adaptive Diagnosis in Distributed Systems. *IEEE Transactions on Neural Networks (special issue on Adaptive Learning Systems in Communication Networks)*, 16(5):1088-1109, 2005, and I. Rish and M. Brodie and N. Odintsova and S. Ma and G. Grabarnik, Real-time Problem Determination in Distributed Systems Using Active Probing. *Proceedings of the 9th IFIP/IEEE International Network Management and Operations Symposium (NOMS 2004)*, pages 133-146, Seoul, Korea, 2004) use a measurement technique that allows fast on-line inference about current system state via active selection of only a small number of most informative probes.

J. E. Stanley and R. F. Mills and R. A. Raines and R. O. Baldwin, Correlating network services with operational mission impact. *Proceedings of the IEEE Military Communications Conference (MILCOM)*, pages 162-168, Chicago, 2005, exploits the relationships captured in CMDB regarding services, components and users to determine the impact of network outages on services and users. Namely, metadata in the network packets blocked by an outage identify the services and users immediately affected and CMDB relationships help determine the further impact.

Reference can also be made to "Algorithm Design and Application of Service-Oriented Event Correlation", Andreas Hanemann, Patricia Marcu, BDIM, NOMS 2008.

SUMMARY

The foregoing and other problems are overcome, and other advantages are realized, in accordance with the exemplary embodiments of this invention.

In a first exemplary aspect thereof the invention provides a computer implemented method for correlating an incident service ticket with an incident resource ticket. The method includes, in response to a creation of an incident service ticket in a certain service category; searching with a data processor for open incident resource tickets of the same or similar category; searching with the data processor based on a set of similarity rules for corresponding critical configuration items defined in business service configuration items and, if both searches succeed, searching with the data processor found incident resource tickets ordered by time using found critical configuration items and, if a match is found, declaring the incident service ticket to be correlated with the matching incident resource ticket.

In another exemplary aspect thereof the invention provides a system configured to correlate an incident service ticket with an incident resource ticket. The system comprises at least one computer-readable storage medium storing computer program instructions and at least one data processor readably coupled to the at least one computer-readable storage medium. Execution of the computer program instructions by the at least one data processor causes the at least one data processor, in response to a creation of an incident service ticket in a certain service category; to search for open incident resource tickets of the same or similar category, to search based on a set of similarity rules for corresponding critical configuration items defined in business service configuration items and, if both searches succeed, to search found incident resource tickets ordered by time using found critical configuration items and, if a match is found, to declare the incident service ticket to be correlated with the matching incident resource ticket.

In a further exemplary aspect thereof the invention provides a computer-readable storage medium containing program instructions that, when executed by at least one data processor, result in performing operations to correlate an incident service ticket with an incident resource ticket. The operations comprise, in response to a creation of an incident service ticket in a certain service category; searching for open incident resource tickets of the same or similar category; searching based on a set of similarity rules for corresponding critical configuration items defined in business service configuration items and, if both searches succeed, searching found incident resource tickets ordered by time using found critical configuration items and, if a match is found, declaring the incident service ticket to be correlated with the matching incident resource ticket.

BRIEF DESCRIPTION OF THE SEVERAL VIEWS OF THE DRAWINGS

FIG. 7 illustrates a non-limiting example of an incident ticket correlation algorithm.

FIG. 8 illustrates a non-limiting example of a greedy constraint adaptive probing algorithm.

DETAILED DESCRIPTION

An aspect of the exemplary embodiments of this invention is to provide a solution to the problems described above by automating the process of ascertaining the connection/relationship between failed resources and malfunctioning services, thereby increasing productivity and reliability while reducing cost.

In contrast to the proposal of Dreo the exemplary embodiments of this invention use novel models for such dimensions of correlation as topology and time. More specifically, the topology aspects are modeled by Configuration Management Database (CMDB) relationships; and the temporal aspects are handled with flexibility based on, for example, constraint adaptive resource polling. In addition, a category-based correlation can be employed.

In contrast to the prior art discussed above, the exemplary embodiments use a novel set of RBR-rules and use adaptive probing (an enhanced concept of active probing) to trigger the creation of relevant resource tickets.

More specifically, active probing is used to trigger the generation of relevant resource tickets and is augmented with an innovation required by a constraint on the overall duration of probing execution and on the number of probes running simultaneously.

The exemplary embodiments of this invention provide in one aspect thereof a model to correlate incident tickets based on a number of criteria. First, a category-based correlation is employed that relies on matching service identifiers with associated resource identifiers, using similarity rules. Secondly, there is a correlation of the configuration items which are critical to the failed service with the earlier identified resource tickets in order to optimize a topological comparison. Thirdly, scheduled resource data collection is augmented with constraint adaptive probing to minimize the correlation interval for temporally correlated tickets.

Figure 1:
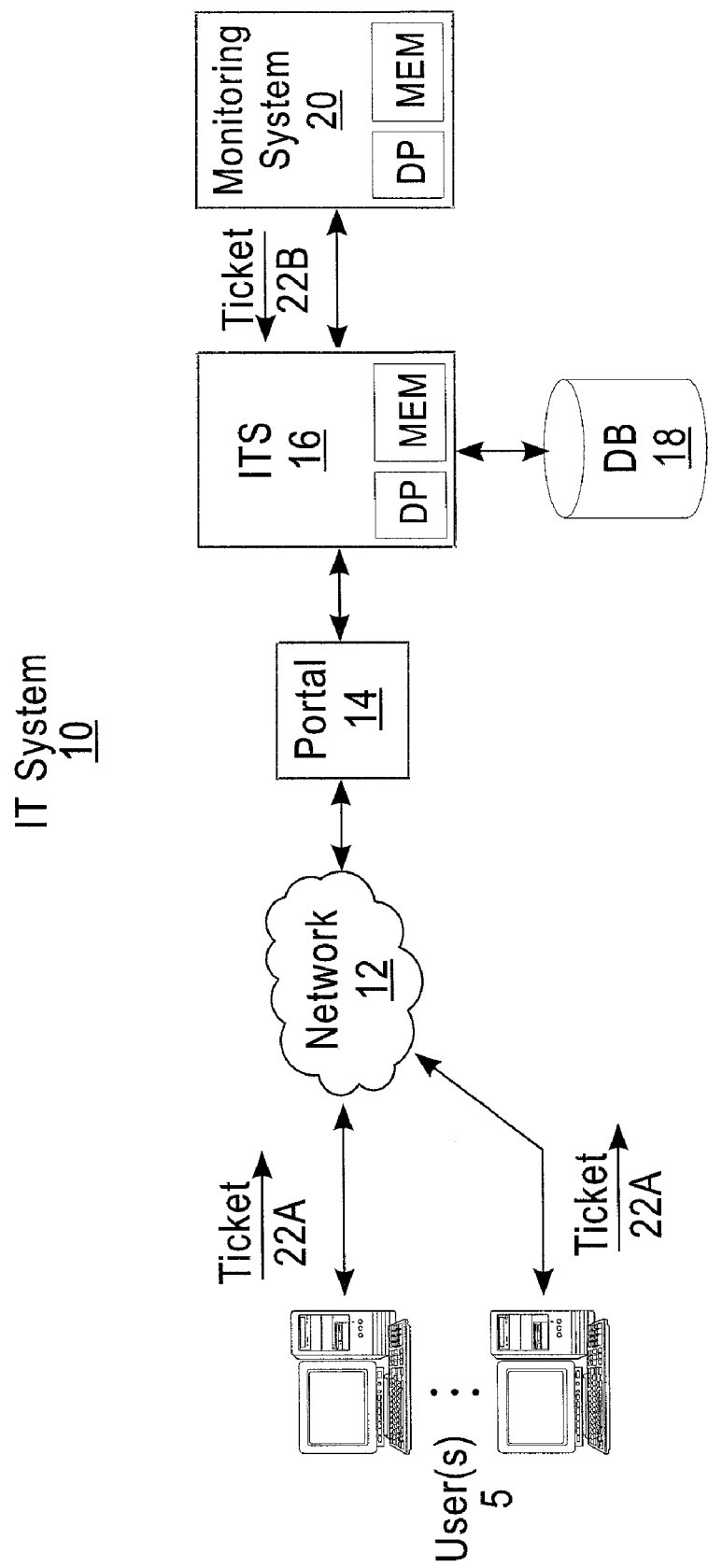
FIG. 1 presents a simplified view of at least a portion of an IT system.
Figure 4:
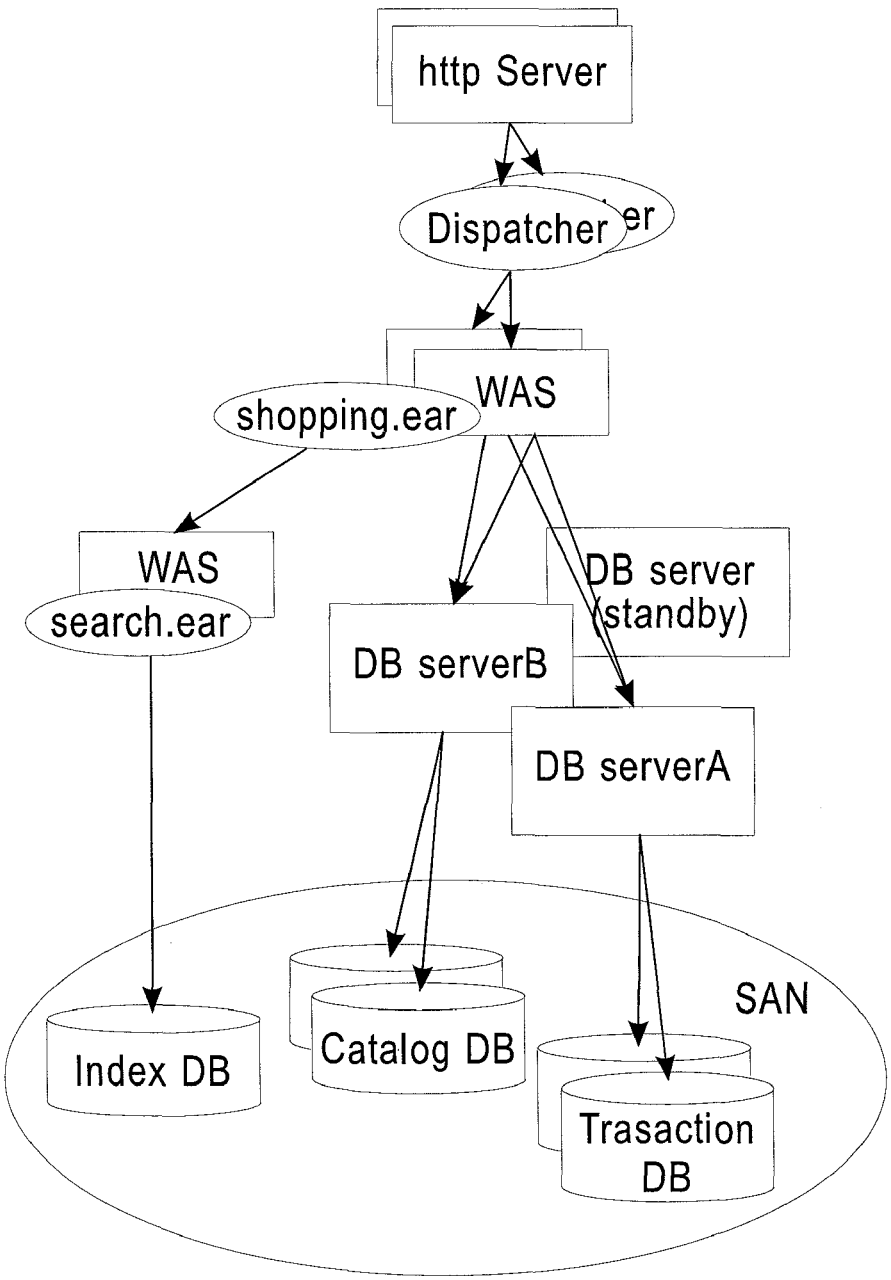
FIG. 4 shows an exemplary service cart and search catalog e-commerce service realization.

FIG. 1 presents a simplified view of at least a portion of an IT system 10 concerned with resolution of incident service tickets. The actual IT system of interest can take a number of different forms. One non-limiting example is shown in FIG. 4 and described in detail below with reference to FIG. 5. Some number of users 5 can be connected to the system 10 via a network 12 (e.g., a local area network (LAN) or a wide area network (WAN)) and one or more suitable portals 14. The portal 14 is connected with an ITS 16 that can have an associated memory, such as a database (DB) 18 for storing tickets and related information. The system 10 also includes a monitoring system 20. The users 5 are capable of generating service tickets 22A and the monitoring system 20 is capable of generating resource tickets 22B. The tickets 22A and 22B (referred to collectively as tickets 22) are directed towards the ITS 16.

It can be appreciated that at least some the illustrated blocks, such as the ITS 16 and the monitoring system 20, will comprise at least one data processor (DP) that is functionally connected with at least one computer-readable medium (MEM) that stores a program or programs of machine executable instructions. At least some of the stored instructions, when executed by the associated data processor(s), result in the performance of methods in accordance with the exemplary embodiments of this invention, such as those made evident in FIGS. 3 and 6.

Different types of tickets 22 that can exist in the ITS 16. For example, a ticket 22A reported by an end user 5 (where the user is reporting an incident from the user's point of view, which is typically a service-oriented view) has a different nature than a ticket 22B generated by the monitoring system 20 (where the monitoring system 20 is reporting incidents arising from resource failures or degenerations). Nevertheless, these two types of tickets 22 have some commonality since the failure of a resource (the ticket 22B generated by the monitoring system 20) could indeed affect a service which was reported as a ticket 22A by an end user 5, even if they are not reported at the same time. The classification of the tickets 22 occurs at the time of ticket creation in order to isolate the cause for a reported end user ticket 22A, as well as to support a root cause analysis and/or problem determination. As a result, an ability to provide a fast classification and correlation of the tickets 22 creates advantages for the users 5 as well as for the service provider who provides the IT system 10. The user 5 is pleased that the reported problem is resolved quickly, while the service provider enjoys a higher efficiency in the root cause analysis and problem determination, while at the same time reducing costs and resource utilization.

While the monitoring system 20 is a useful tool for ITSM, it is unrealistic to expect that all elements of the IT infrastructure will be constantly monitored. Typically in a large data center monitoring of critical resources is done periodically. The variation of the monitoring interval depends on criticality and stability of the resource. For some resources the monitoring is set up to be triggered manually in order not to overload the network.

A ticket 22B created by a monitoring system typically provides information from the point of view of the low level resource on which the service is based, such as reports of server failures or overload, or network router failure. Thus in the ITS 16 can coexist the two categories of related tickets 22, namely the tickets 22A from the end user and the tickets 22B from the monitoring system 20, but relationships between them are not immediately identified. The link between tickets is typically realized manually but this, often, is an expensive process in terms of manpower and productivity. It is important for effective incident management to identify tickets 22 which are redundant or potentially have the same root cause.

The multi-stage (multi-step) correlation process that is an aspect of the exemplary embodiments provides advantages over the prior art approaches. For example, class-based filtering and initial focus on the critical resources for the failed service speed up the process by limiting the likelihood of expensive CMDB searches. Further by example, adaptive resource polling/probing increases the quality of the results by limiting the impact of the time lag in generating resource tickets 22B.

The exemplary embodiments of this invention enable the rapid search through a potentially large number of tickets 22 at the ITS 16 by the use of similarity rules, critical items and active probing.

A typical search can proceed as follows. The user 5 creates a ticket 22A and the operator take the ticket 22A and searches in the database 18 for some other ticket or tickets which could be related to the ticket 22A. As can be appreciated, if there are hundreds or even more tickets 22 stored in the database 18, a significant amount of time can be required.

The exemplary embodiments of this invention improve on this process by reducing the number of tickets 22 which need to be searched by introducing the use of similarity rules and the concept of criticality. The similarity rules are stored in a service definition and match a possible classification of the ticket 22A from the user 5 to a possible classification of a ticket 22B from the monitoring system 20. The criticality is a combination of the service definition (as a general description of the service) and a business service configuration item (CI) which is an instance of the service definition which is tailored to the use of the user 5 (the customer). By the use of the similarity rules and the concept of criticality the number of tickets 22 to be searched can be reduced significantly.

The exemplary embodiments also make use active probing, which additionally reduces the search time. If the monitoring system 20 retrieves tickets 22B only in a certain time slot, many tickets could be therefore missed when a user creates a new ticket 22A. As such, the monitoring system 20 generates a ticket 22B on demand concerning a resource which could be relevant for the service for which the user 5 creates a ticket 22A.

The exemplary embodiments thus provide a system and method of incident/problem resolution that is based at least on correlating resource-related tickets 22B and service-related tickets 22A, reducing the size of a problem determination space based on the correlation and reducing a number of needed tests based on the correlation. The resource tickets 22B can be self-generated based on configuration information, service instance and service definition information and on-demand active probing.

Describing the exemplary embodiments now in even further detail, for the design of an algorithm for ticket correlation several concepts are defined: tickets, services and configuration items.

A ticket is a record of an incident the witnesses or records the entirety of the information related to the incident, for example, who (what) reported the incident, when was it reported, what priority does the incident have, who is working on the resolution and/or what is the actual status of the ticket. As it is desirable to correlate tickets 22A which were opened from end users 5 with those tickets that were automatically generated by the monitoring system 20, a static model of a ticket 22 is useful in order to enable correlation. The classification of the tickets 22 as resource tickets 22B (reported by the monitoring system 20) and service tickets 22A (opened by an end user 5) is thus employed.

Figure 2:
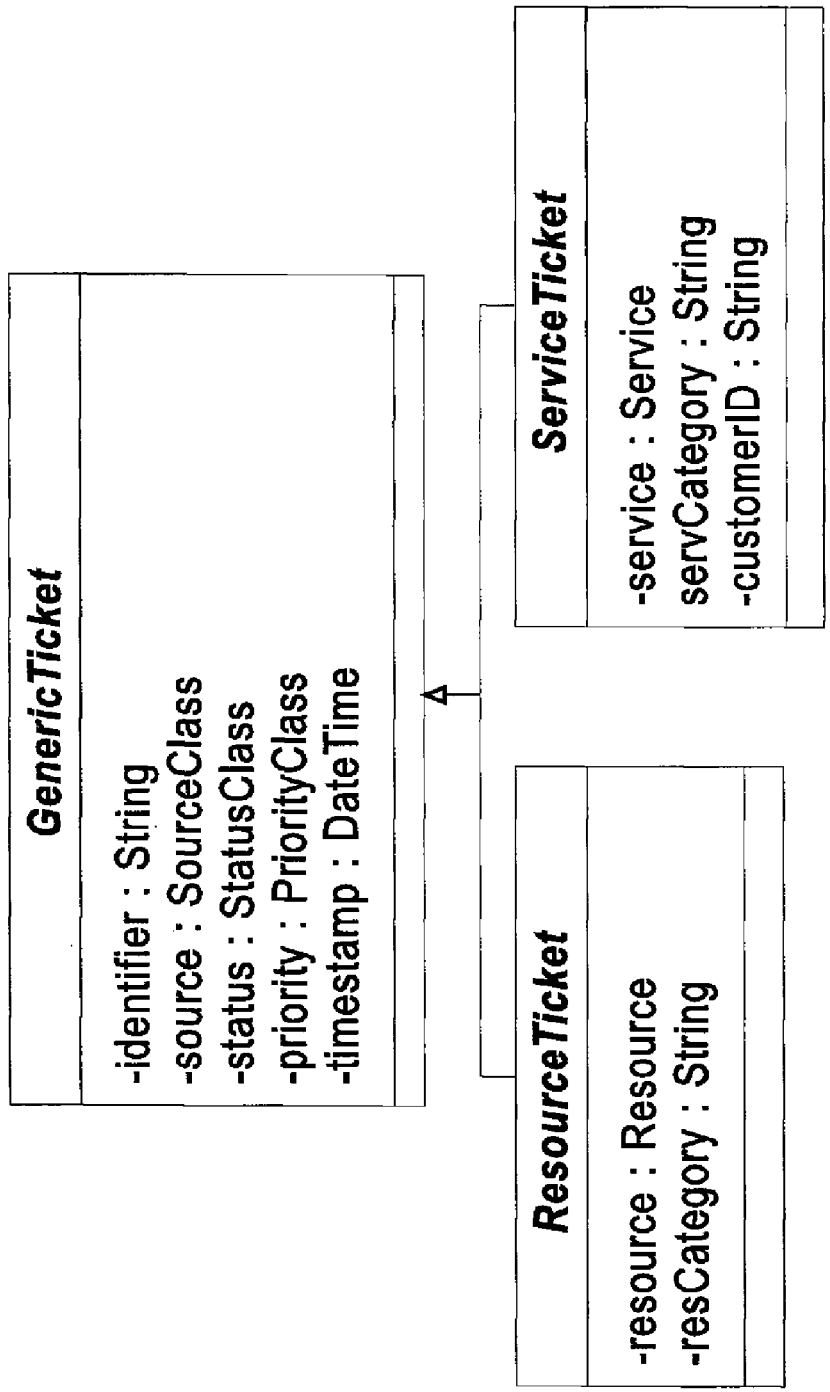
FIG. 2 shows an exemplary ticket class hierarchy.

Referring to FIG. 2, a GenericTicket includes an identifier: String; a source: SourceClass; a status: StatusClass, a priority: PriorityClass and a timestamp: DateTime. A ResourceTicket includes a resource: Resource and a resCategory: String. A ServiceTicket includes a service: Serviceand a servCategory: String.

In FIG. 2 "hierarchy" of tickets is thus defined. The two abstract classes ResourceTicket and ServiceTicket, representing the two types of tickets 22B and 22A, respectively, inherit from the GenericTicket class. The attributes for the GenericTicket class are as follows. As a ticket has always a unique reference number, also known as a case or ticket number which is used to allow the user or support staff to quickly locate, add to, or communicate the status of the user's issue or request, in the illustrated approach this is represented by the attribute identifier which typically is a string. The ticket 22 also has an attribute (source) which refers on the origin of the ticket which could be an element of the set SourceClass (that means the ticket was created by the user 5 or by the monitoring system 20). The attribute status describes the current state of the ticket 22. For example, a ticket 22 which was just opened has the status new, one which had been received and/or forwarded has the status pending, and a closed ticket has the status closed. As the status can have more than these states, the StatusClass is preferably specified by the service provider. The next attribute is the priority which, in terms of ITIL, is determined by taking into account both the urgency (how quickly the service needs to be restored) and the impact (what extent has the incident on the service). This is an attribute of type PriorityClass, which also is preferably defined by the service provider, and can take values such as (by example) low, normal, high. The timestamp is of the form DateTime which denotes the time of creation of the ticket 22. In addition to these generic ticket attributes the classes ResourceTicket and ServiceTicket have their own attributes. The class ResourceTicket has two additional attributes: resource and resCategory. The first indicates which resource is affected in this ticket and the second is type kind of service definition represented by a string such as, for example, resource/servers/gdrd01, which denotes in a tree representation what the involved components are.

The service definition is specified by the service provider in a service catalog. The service definition as used herein has two important components: categories and similarity (matching) rules. A category of service is the exact name of the service. For example, names of categories of services can be e-mail service, web hosting service, storage service. Typically these categories are defined from the point of view the customer, without the need for a technical and/or specific vocabulary.

An important point is thus the differentiation between different service categories which aids in reducing the number of searched tickets. For example, only those tickets 22 which in some manner refer to the same service can be searched. These are represented as a classification tree which is an attribute of the ticket definition (see resCategory and servCategory).

Another important point which together with the service category reduces the number of search candidates is the similarity rule. In accordance with an aspect of the exemplary embodiments of this invention the similarity rule can be considered as a rule that matches the classification the user 5 made at the time of the creation of a service ticket 22A and that made by the monitoring system 10 at the time the resource ticket 22B was created. This can have a simple if servCategory then resCategory form. It can be assumed that each ticketing system has its own ticket classification system.

What follows is one non-limiting example. Assume that a user 5 cannot read e-mails and creates a ticket 22A that is classified using the following "classification tree": EndUser/Software/Email/cannot read. The principal part of this classification tree is EndUser/Software/Email which denotes that it is a ticket 22A which has to do with the e-mail service of the system 10, and that this ticket was created by a user 5. This classification tree forms a first part of the similarity rule. The second part of the classification rule is as well a classification tree, but for a resource ticket 22B.

One possible example of rules of the service definition is as follows:

if EndUser / Software / Email then Hardware / Server/ EmailServer
or
if EndUser / Software / Email then Hardware / Storage / Database
or
if EndUser / Software / Email then Hardware / Server / Fileserver.

If one assumes for the particular system 10 deployment that these are all of the similarity rules that can apply to the e-mail service, then it can be appreciated that it becomes possible to limit a search to a smaller number of tickets 22.

With respect to the configuration items (CIs), two different types of CIs may be considered: a dependency tree and a Business Service CI.

The dependency tree is a graphical or non-graphical (topological) representation of a network with all of the network components and the dependencies between the network components. A dependency tree typically exists for each network system. By searching the dependency tree a malfunctioning service can be related to a nonfunctional resource. However, as the complexity of the dependency tree increases the size of the search space increases as well. The dependency tree concept is employed by the exemplary embodiments of this invention to reduce the number of searches needed over the entire set of resource tickets to only those that relate to the dependent components.

The Business Service CIs are an instantiation of the service definition associated with the provider that is related to a particular user 5 who created a ticket 22 for the specific service. In the exemplary embodiments these CIs contain information of which service the customer (provider) runs on which machine, which version of software is running, and other related information. For example, assume that it is known that the e-mail service instance for customer A runs on a specific server gdri51 and not on any other server. This information can thus be employed to aid in finding the critical CIs related to the running of the service for this customer.

Figure 3:
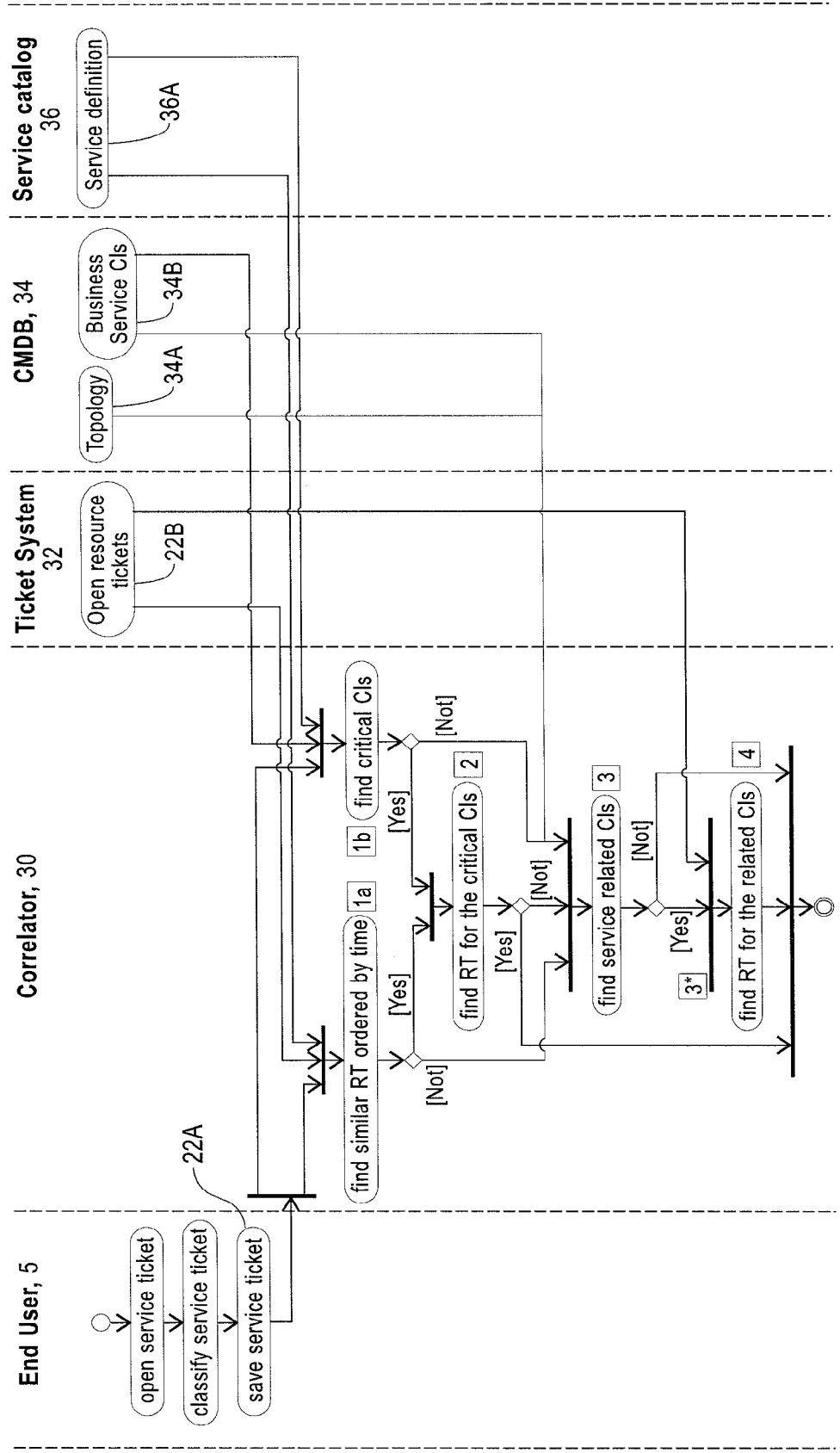
FIG. 3 shows a non-limiting example of a correlator activity diagram, which may be viewed as well as a process flowchart, that describes, stepwise, the steps of a correlation process from service ticket creation by a user.

Described now is the correlation model. The correlation model is used advantageously for the search discussed above. FIG. 3 shows a first non-limiting example of a correlator activity diagram (FIG. 6, described below, provides a somewhat modified version of the correlation activity diagram) that describes, stepwise, the steps of the correlation from ticket creation by the user 5 (service ticket 22A). On the left side of the diagram there is a domain labeled End User, and shows the activities performed by one of the users 5, i.e., open service ticker, classify service ticket, and save service ticket. On the right side is the service provider domain. Activities of the provider, shown in the right part of the diagram, are separated into four columns. The correlator 30 realizes correlation activities. The ticket system 32 includes open resource tickets 22B used in the correlation. The CMDB 34 includes the dependency tree (topology 34A with related CIs) and the Business Service CIs 34B (with their critical CIs) as defined above. The service catalog 36 represents the interface to the customer. In the service catalog 36 is found the service definition 36A.

The process starts in the End User domain with opening a new service ticket 22A. The user classifies the service ticket 22A using the system-provided classification and then saves the newly-opened ticket. From this point on the activity is performed in the correlator sub-domain. Two activities labeled 1*a* and 1*b* execute in parallel.

Activity 1*a*: Similar tickets from the open resource tickets (RTs) 22B (of the Ticket System sub-domain) that are ordered by time are searched. For this activity to occur information from the service definition is used, where the similarity rules are stored. The result of the search is either affirmative (yes) or not, depending on whether at least one open resource ticket 22B is found.

Activity 1*b*: Critical CIs as defined in the Business Service CIs, combined with the category of service from the service definition, are searched. The result of the search is either affirmative (yes) or not, depending on whether at least one critical CI is found.

If both activities 1a and 1b return 'yes' then activity 2 is performed, otherwise activity 3 is performed.

Activity 2: For the found critical CIs a search in the similar RTs 22B, ordered by time, is made to locate any corresponding RTs 22B. If any corresponding similar RTs 22B are found (the 'yes' branch) the correlation is completed. This represents a best-case outcome.

Activity 3: If there are no RTs 22B been found for the critical CIs then input is needed from the dependency tree (topology) and from Business Service CIs. What follows then is finding service-related CIs. If no service-related CIs are found then the correlation terminates as there are no RTs 22B which can be correlated with. Otherwise activity 4 in the typical activity path is performed and activity 3* in the optimized path.

Activity 4: If related CIs have been found then with the input of the open RTs 22B in the Ticket System sub-domain a search is made for RTs 22B for the located related CIs. The correlation ends after this step either with a list of correlated RTs 22B, or with an indication that there are no correlated RTs 22B.

Activity 3*: This step is used as an optimization of the search. Note in this regard that after activity 3 was performed it may be the case that no tickets for the last time slot are available, or it may be the case that there are still too many open tickets to search. In this situation there is performed probing on demand (active probing) of the monitoring system for only the discovered related CIs. In this manner resource tickets 22B can be generated on demand.

The foregoing overview should make it apparent that the exemplary embodiments can be used to advantage in a number of different types of network/computing environments. For example, a typical end-user application can include a large variety of computing systems, ranging from personal computers to clusters of servers and up to mainframes. This infrastructure supports a large range of services ranging from personal-computing to enterprise services (like email) to business services (like application-service provider).

In such a system millions of trouble tickets can be created over a period of a few years and multiple types of monitoring tools can be employed. For example, some monitoring tools can focus on system and application vitals. Samples system vitals include CPU and file system utilization, network interface status and file sizes. Sample application vitals include web application servlet response time, JDBC call response time and database table space utilization. In the context of this invention the tickets generated by these tools can be considered as the resource tickets 22B.

In this type of environment several challenges can arise related to the problem of ticket correlation. For example, one challenge is related to the handling of the delayed delivery of resource tickets 22B due to the specifics and configuration of the monitoring tools and systems 20. This motivates the use of an approach for additional resource pooling during the ticket correlation process.

Another challenge relates to the handling of a large number of redundant tickets. Redundancy is mainly observed for resource tickets 22B and can be caused by the use of threshold-based policies for notification of potential critical situations. Once the system vital reaches the threshold, resource tickets 22B are generated periodically until the situation is cleared. Therefore, the time spent with manual analysis of redundant tickets can be relatively high, which motivates the need for the automation of ticket correlation.

Another challenge relates to the handling of repeated service tickets 22A at varied time distances from the related resource tickets 22B. In a typical use case scenario service tickets 22A can arrive within a few minutes of the relevant resource ticket 22B, or after one or more days, while the root cause is being solved.

FIG. 4 depicts an exemplary tiered J2EE enterprise application deployment includes front-end http servers, request dispatchers, WebSphere® application servers (WAS), and back-end database servers (WebSphere is a registered trademark of the International Business Machines Corporation). Multiple instances of http servers and WAS servers are used for load sharing. Standby servers are configured for fail-over protection of the request dispatcher and the database servers. The databases reside in a storage system and are connected via a storage area network (SAN) to database servers.

The e-commerce application is packaged as the enterprise archive file shopping.ear, which includes shopping cart and catalog search services. The shopping cart service employs two databases, one for the catalog records and shopping transaction records. Each database is deployed on a different database server for security and performance reasons. The catalog search service is a search engine, packaged as the enterprise archive search.ear and deployed on a different server from the shopping cart service. The deployed application accesses the index database in order to serve the search requests from shopping.ear.

Figure 5:
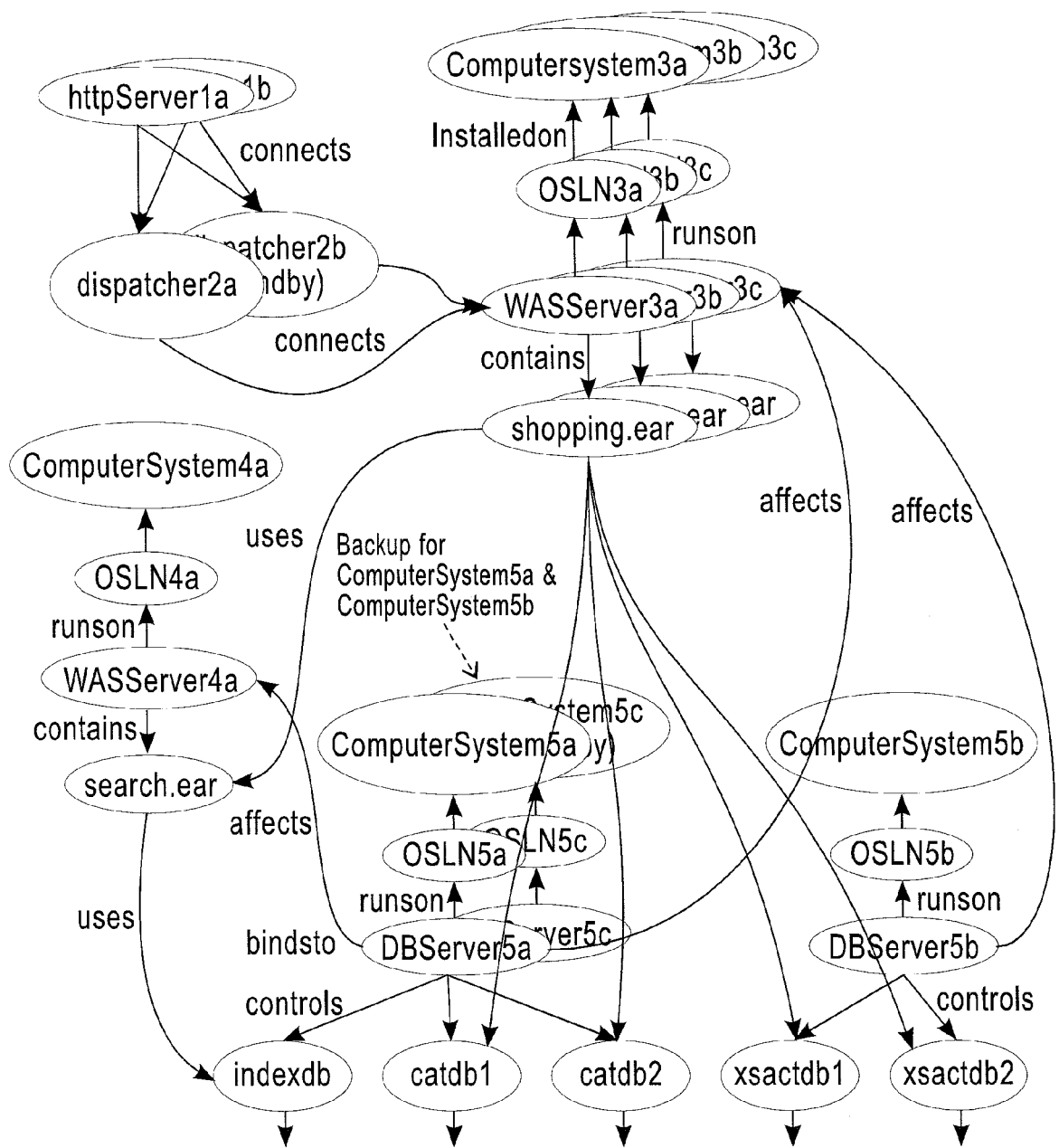
FIG. 5 shows an exemplary service system mapping for the service realization of FIG. 4.

FIG. 5 provides a detailed view of a configuration of the systems depicted in FIG. 4. This view is derived from the configuration data available in the configuration management system. It visualizes the relevant system artifacts (the circles) and their relationships (the arrows and annotations). For example, the WAS server in FIG. 4 is represented by three configuration items:

a computer system (e.g. ComputerSystem3a)
an operating system (e.g. OSLN3a) which has an "installedon" relationship to the computer system, and
a WAS server (e.g. WASServer3a) with a "runson" relationship to the operation system Other note-worthy relationships include:
the database servers affect the WAS servers, e.g. DBServer5a has an "affects" relationship with the WEB servers WASServer3a, WASServer3b, and WASServer3a;
the databases reside on the SAN, therefore they have "resideson" relationships to the storage subsystems in the SAN;
storage subsystems are mounted to the operating systems in which the database servers run on; therefore they have a "bindsto" relationship to the operating systems; and
the applications use the databases, e.g. search.ear has a "uses" relationship with the indexdb.

The information of FIG. 5 is used in the following sections to provide a non-limiting example of procedures by which the exemplary embodiments of this invention correlate end user tickets 22A with system generated tickets 22B in order to aid in identifying root causes.

Described now in further detail are exemplary models and algorithm for the correlation of incident tickets.

Discussed first are various concepts used in an exemplary embodiment of an algorithm for ticket correlation. Namely, there are formalized the concepts of ticket, service and configuration item (related and critical CIs). Also introduced is the concept of constraint adaptive probing (CAP).

To reiterate, a ticket 22 is a record of an incident, including all pieces of information related to the incident, such as the reporter of the incident (person or software component), the date of reporting, what priority the incident has, the person assigned to work on the resolution, the current ticket status, and other details.

Tickets are classified as 1) resource tickets 22B, when they are reported by the monitoring system 20, and 2) service tickets 22A, when they are opened by an end user 5, representing the users' perceived experience of a service.

Discussed again, and in further detail, is the class hierarchy of tickets 22 shown in FIG. 2. The two classes ResourceTicket and ServiceTicket, representing the two kinds of tickets mentioned before are subclasses of the GenericTicket class.

The GenericTicket class has the following attributes:
identifier, which typically is a string, representing the unique reference (or case) number for the incident report; and
source, with possible values resource and service, identifies the origin of the ticket as resource-based monitoring or end-user service, respectively.

The attributes status, priority and timestamp are basically not germane to this discussion.

In addition to these attributes, the classes ResourceTicket and ServiceTicket have their specific attributes. The class ResourceTicket has two further attributes:
resource, which is a unique identifier for the affected resource; and
resCategory, which is a unique identifier for the resource category.

The class ServiceTicket has three specific attributes:
service, which is the service unique identifier for the service that the end user has a problem with;
servCategory, which is the unique identifier for the service category; and
customerID, which identifies the end-user that is experiencing service problems.

Table 1 shows an example of a resource ticket 22B and a service ticket 22A, with all the related attributes defined in relation to the elements depicted in FIGS. 4 and 5.

TABLE 1

Example of Resource and Service Tickets

| Attribute | Resource Ticket Value | Service Ticket Value |
|---|---|---|
| identifier | 320054D | 453999 |
| source | resource | service |
| status | pending | new |
| priority | medium | high |
| timestamp | 081320081245 | 08132008928 |
| resource | indexdb | shopCatalog |
| resCategory | HW/Server/WAS/indexdb | |
| service | | shopping cart |
| servCategory | | SW/webAppl/searchCatalog |
| customerID | | A2816AB |

The service definition is specified by the provider in the service catalog. The service definition has at least two important elements: service category and similarity (matching) rules. Typically categories are defined from the point of view of the customer. The similarity rules relate the service to an abstract representation of the infrastructure (resource) component. These could typically be provided as part of the service definition in the service product offering and developed during service design.

The similarity rule is one exemplary aspect of this invention. As the name suggests, it is a rule that matches the classification the user 5 chose at the creation of the service ticket 22A to one that is made by the monitoring system 20 at the creation of a resource ticket 22B. This can take the very simple form: if servCategory then resCategory. For one service category more similarity rules may exist. It can be assumed that each ticketing system has his own system of ticket classification.

As one non-limiting example, assume that a user 5 creates a ticket for the shopping cart and search catalog e-commerce service depicted in FIG. 4. The service category represented in this case as a "classification path" can be SW/webAppl/searchCatalog/cannotSaveSearch. The principal part of this classification path is SW/webAppl/searchCatalog which denotes there is a ticket for a web application search catalog. The possible rules in the service definition are:

--- if SW/webAppl/searchCatalog then HW/Server/WAS or
if SW/webAppl/searchCatalog HW/Server/WAS/indexdb or
if SW/webAppl/searchCatalog HW/Storage/Database/CatalogDB or
if SW/webAppl/searchCatalog HW/Storage/Database/TransactionDB

---

The dependency tree is a representation of a network with all of its components and the relationships between them. These components are the related CIs.

As an example, reference is made again to FIG. 5, which shows a part of the dependency tree for the realization of the service catalog shopping. In thus representation, and by example, httpServer 1a is depending on dispacher2a. The dispacher2a depends on WASServer3a, ComputerCystem3a and OSNLN3a. The WASServer3a depends on data base server DBServer5a and DBServer5b. DBServer5a depends also on WASServer4a which depends on the indexdb. The other data bases which are controlled from the database servers DBServer5a: catdb1, catdb2 are dependents of the shopping.ear contained in WASServer3a.

A Business Service CI is an instantiation of the service definition. It is of significance to the exemplary embodiments that the Business Service CI contains information on the CI instances that are critical for support of the service instance for a specific customer. Critical CIs are also included in the dependency tree, as a subset of related CIs.

As an example, the Business Service CI can be an instance of the catalog shopping service for the customer A2816AB. Critical CIs for this instance are the dispacher2a, WASServer3a, WASServer3a and DBServer5a.

Constraint Adaptive Probing (CAP) is a technique for finding the most effective way of probing CIs in an often large dependency tree within a given duration of time and without overloading the network.

Described now in further detail is the optimized correlation model that is an aspect of this invention. One goal is to reduce the computational overhead and increase the accuracy of determining correlated service and resource tickets 22. Namely, given a service ticket 22A and a pool of resource tickets 22B, the optimized correlation model is based on three components:
category-based correlation, which filters the resource tickets 22B based on the similarity rules;
critical-CI-based correlation, which filters the resource tickets 22B based on their reference to the CIs that are critical for the failed service, where by examining only the critical CIs, the overhead of the dependency tree search, also called topological comparison, is minimized; and
temporal correlation, which uses CAP to ensure the optimum manner in which to probe the CIs in the dependency tree in order to trigger a creation of resource tickets 22B by the monitoring system 20.

Figure 6:
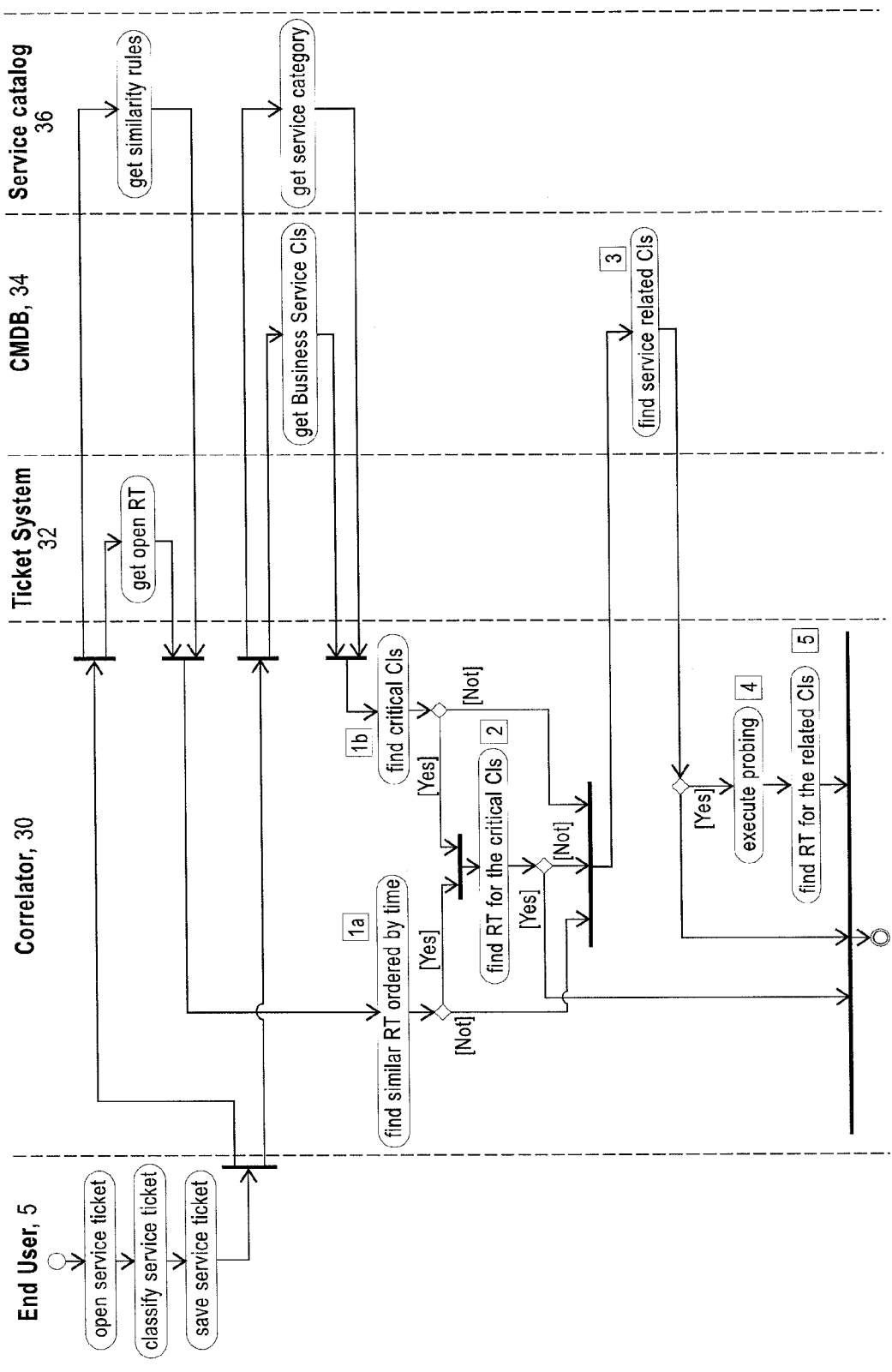
FIG. 6 presents another view of the non-limiting example of the correlator activity diagram of FIG. 3, and which may also be viewed as a process flowchart.

The activity diagram in FIG. 6 presents another view of the activity diagram of FIG. 3 discussed above, and describes the steps of the correlation process, starting from the creation of the service ticket 22A by the user 5.

As in FIG. 3, the column on the left side of the diagram shows the activities of the End User 5. On the right side is the service provider domain. Activities of the provider, shown in the right part of the diagram, are separated into four columns. The correlator 30 realizes correlation activities. The ticket system 32 includes open resource tickets 22B used in the correlation. The CMDB 34 includes the dependency tree (topology 34A with related CIs) and the Business Service CIs 34B (with their critical CIs) as defined above. The service catalog 36 represents the interface to the customer. In the service catalog 36 is found the service definition 36A.

The activity starts with the End User 5 opening and classifying a new incident ticket, through selection of a classification path. For example, user B of customer A2816AB opens a ticket regarding the service catalog shopping with the service category SW/webAppl/searchCatalog/cannotSubmitRequest. From this point on the activity is driven from the correlator domain 30. Before correlation can occur additional data is retrieved from the above named domains. Existing open resource tickets (RT) 22B are retrieved from the ITS 16. Through the service category (classification path) in the service ticket 22A, all relevant similarity rules are obtained from the service definition 36A. Concurrently the service category and the customer identification (from the service ticket 22A) are retrieved from the Business Service CIs 34B. Using the data above, the two activities 1a and 1b are processed in parallel.

1A. Finding similar tickets from the open resource tickets 22B (of the Ticket System 32) ordered by time. First a comparison between different service categories is performed. This aids in reducing the number of searched resource tickets to only those tickets which somehow refer to this service. This information is stored as values of the attributes resCategory and servCategory of the ticket and can be matched with the similarity rules in the service definition. The depth of the classification path is, for example, 4. However, typically the deeper the classification path the more refined the search is, and the higher the precision in rule matching. This classification path is the first part of the similarity rule. The second part will be as well a classification path but for a resource ticket, in most cases indicating on a faulty resource.

1B. Finding critical CIs, defined in the Business Service CIs 34B combined with the service category from the service definition 36A. This information is retrieved through the value of the attribute customerID contained in the service ticket 22A and the service category of the service definition 36A.

If both these activities succeed, activity 2 follows otherwise activity 3 is performed.

2. Critical CIs found in activity 1B are used to search the similar RT 22B from activity 1A ordered by time for corresponding RTs. If a match is found then the correlation is complete (best use case outcome).

3. If there were no RTs 22B found for the critical CIs then input is needed from the dependency tree (topology 34A) for the Business Service CIs 34B. If no related service CIs for this service have been identified, than the correlation concludes as there are no RTs 22B that can be correlated. Otherwise, the process follows the next step. The related CIs (in the dependency tree 34A) by definition include the critical CIs as well. As a result, candidates in the search cannot be overlooked as any CIs that were not found during activity 1B are surely found during activity 3.

4. In this approach it can be assumed that in some cases no resource tickets 22B for the last time slot are available after activity 3 was performed due to, for example, the configuration of the monitoring system 20 (e.g., the periodicity of the monitoring process). In this situation CAP is used on the resources in the dependency tree. The probing of a faulty resource or resources generates corresponding resource tickets 22B. The role of CAP is to find the most effective way of probing for a given set of CIs within a dependency tree that can be completed during a given time duration with a restriction on the number of probes that can be executed in parallel. CAP is discussed in further detail below with reference to FIG. 8.

5. Again the Ticket System is searched on the RTs 22B (generated by CAP) for the related CIs. The correlation ends after this step either with a list of correlated RTs 22B or with the result that there are no correlated RTs 22B.

FIG. 7 describes the foregoing correlation algorithm in pseudo-code with additional (and exemplary) implementation details. The procedure IncidentTicketCorrelation implementing the activity diagram in FIG. 6 starts with initializing all lists which are used in the algorithm.

A list of open RTs 22B and the similarity rules are retrieved (lines 4, 5) from the ticket system 32 and from the service definition 36A, respectively. The service category 36 is obtained from the service ticket 22A (line 6). The specific resource category of the similarity rules for the identified service is added to the list of resources (lines 7-10) and the list of similar resource tickets 22B is filled (lines 11-18). These steps correspond to Activity 1A in the activity diagram of FIG. 6. Activity 1B is realized in line 20, and Activity 2 in lines 21-26. Related CIs are found in line 27 (corresponding to Activity 3 in FIG. 6). Finally the list of resource tickets for related CIs is filled and the list of correlated CIs is returned. Constraint adaptive probing (CAP) is realized at line 32.

Discussed now in further detail is an exemplary embodiment of CAP.

In the CAP it is generally desired to determine a sequence of sets of probes which guarantees to minimize the number of CIs to be probed manually regarding a certain incident.

For example, assume that one of the CIs in the dependency tree of the service failed. The goal is to find failed CIs and, through probing, to trigger the generation of one or more RTs 22B. If the dependency tree is large and all probes are executed sequentially the probing exercise could take a considerable amount of time. Since the ticket system 32 is searched after the probing is completed it is desirable to restrict the duration for the probing, which implies that the number of sequential tests should be limited.

Another restriction is a limitation on the number of probes that run in parallel as, in some cases, multiple probes issued simultaneously could negatively affect the operation of the network. The problem that is presented is thus how to exercise constrained adaptive probing in view of the following constraints:

a) a number of sequential tests (probes) should not exceed a predefined number L; and
b) a number of parallel tests should not exceed a predefined number P,
so as to find a sequence of sets of probes such that the number of CIs that is left to be considered is minimal.

This problem is NP hard, since it contains the problem of active diagnosis as a sub-problem (see the above-referenced I. Rish et al., Adaptive Diagnosis in Distributed Systems. As an approximate solution to the CAP an algorithm can be based on the greedy approach.

DEFINITIONS

Assume that a service's dependency tree contains n CIs or nodes $N=\{N_1, \ldots, N_n\}$ each of which could be in one of two states OK or FAILED. As in the example above the CIs in the dependency tree could represent a physical component (server, network, hub, etc.) or software components (web application, etc). The state of the business service that relies on this dependency tree is denoted by a binary vector $X=\{X_1, \ldots, X_n\}$, where $X_i$ is one of the states OK or FAILED of a CI $N_i$.

A probe or test T is a method for finding information about service's CIs. Denote by $N(T)=\{N_{T1}, \ldots, N_{Tj}\}_{j=1} \subset N$ a set of CIs which are tested by probe T. Probe T fails if one of the CIs is in state FAILED and succeeds if all CIs in N(T) are OK. For simplicity it may be assumed that each test takes time 1

Dependencies between different CIs are expressed in the form of dependency Matrix D(m×n), where $D_{ij}=1$ if $N_j$ depends on $N_i$ or $N_j \rightarrow N_i$. For the set $\tilde{N} \subset N$ denote $BD(\tilde{N})=\{N_i \in N | \exists N \in \tilde{N}$ such that $N \rightarrow N_i\}$.

The dependency matrix and probes are related as follows: if probe T is OK then BD(N(T)) is OK.

In this embodiment Khinchin's approach is followed (A L Khinchin, *Mathematical foundations of information theory*. Dover, New York, 1956). Let P denote a partition to the set of CIs N and $P(\{A_1, \ldots, A_m\})$ denote partition generated by the sets $\{A_1, \ldots, A_m\}$ from N.

Information of the partition is defined as $$I(P) = \sum_A \chi_A \log p(A) \quad (1)$$

where $\chi_A$ is a characteristic function of and sum is taken over all atoms of the partition P. Relative information of partition $P_1$ to partition $P_2$ is defined as $$I(P_1 | P_2) = -\sum_A \chi_A \log p(A | P_2) \quad (2)$$

where $p(A|P_2)$ is a conditional probability of A relative to $P_2$. We also consider conditional entropy $$H(P_1|P_2) = \int I(P_1|P_2) dp \quad (3)$$

where dp is a normalized counting measure on N.

The Greedy Constraint Adaptive Probing Algorithm depicted in FIG. 8 is a polynomial approximation of the solution for the Constrained Active Probing Problem.

Described above has been exemplary embodiments of this invention pertaining to incident ticket correlation that improves the accuracy and effectiveness of the incident/problem management process. In particular, what has been provided has been a correlation capability that leverages insights drawn during both service definition and the description of the deployed infrastructure in configuration management systems. The exemplary embodiments exploit an optimization model based on stepwise correlation in which service categorization is augmented with service/resource similarity rules to facilitate selection of resources that demonstrate correlation between tickets. This approach can be augmented by CAP, such as by the Greedy Constraint Adaptive Probing Algorithm shown in FIG. 8 and described above, to dynamically identify additional resource details needed for correlation when they are not directly available based on limitations of the monitoring system 20.

It should be appreciated that additional embodiments can extend the correlation model to handle tickets originated from different Incident Ticket Systems. This applies to heterogeneous service environments with multi-supplier hierarchies as well as to multi-stage services provided by multiple, equal partners.

An aspect of the exemplary embodiments introduces at service design time the association of service categories to resource categories (as similarity rules).

A further aspect of the exemplary embodiments introduces at service instantiation time the association of service instance to specific resources (critical CIs), which are candidates for initial assessment, based on historical data and/or prior knowledge.

Another aspect of the exemplary embodiments automatically correlates end user tickets as they are created to existent resource tickets.

A further aspect of the exemplary embodiments introduces probing on-demand as a mechanism for the system to generate resource tickets, and constrains the probing time and parallelism based on specific parameters of the probe and the network.

A still further aspect of the exemplary embodiments provides an ability to optionally update critical CIs based at least on data gained from a prior correlation process, thereby making the system adaptive.

Among the numerous benefits gained by the use of the exemplary embodiments is an increase in the productivity in root cause analysis, as well as a visible reduction in the number of tickets after each step of the stepwise correlation process.

The exemplary embodiments of the optimized model of incident tickets correlation are based at least in part on category-based correlation, the matching of a service category with a resource category (similarity rules), the correlation of critical configuration items (critical CIs), the searching of tickets on a service's critical CIs, a minimization of a correlation interval for temporal correlation and active probing (constraint adaptive probing).

An aspect of the exemplary embodiments of the optimized model of incident tickets correlation is to establish the similarity rules between specific service and resource categories represented by a classification path. Based on the similarity rules the matching of service category to resource category is automated, thereby removing the conventional need to manually attempt to correlate a service ticket 22A with a resource ticket 22B.

With respect to the critical CIs for the Service Instance, the exemplary embodiments overcome the problems inherent in conventional practice where the CMDB information tends to be very granular to sustain the delivery and the management of the service, where a dependency tree (related CIs) for each service can be very complex, and where often all existing resource tickets 22B are searched on all related CIs for possible root causes. These problems are overcome at least in part by identifying critical CIs within an instantiation of the failed service (as Business Service CIs), by searching the ticket system 32 for tickets on the service's critical CIs only, and if critical CIs are not affected (no corresponding resource tickets 22B exist) by searching tickets on all related CIs in the dependency tree.

The exemplary embodiments also overcome the problems inherent in conventional probing practice, as it is unrealistic to expect that all resources of the IT infrastructure are constantly monitored. In actuality, in a large data center the monitoring of critical resources is done periodically during time slots. These problems are overcome by the use of constraint adaptive probing (CAP) on-demand, where CAP is performed if resource tickets 22B for related CIs are not present in the ticket system 32. The use of CAP enables probing to be completed within some specified time and without overloading the network, and the use of CAP produces resource tickets 22B on-demand.

The underlying problem statement related to probing is to find the most informative sequence of sets of probes for the given configuration dependency graph that is executable within some certain period of time, with a restriction on the probes that can be issued simultaneously without overloading the network. This problem is NP hard and the sub-problem of the problem is also NP Hard.

The exemplary embodiments overcome these difficulties with constraint active probing by reducing everything to the partition of the configuration space, where each test/probe makes partition atoms smaller, by the use information theory to measure the gain from each test/probe, and by the use of the greedy approach to determine find the most informative sets of probes at every step.

As should be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The computer readable medium may be a non-transitory storage medium.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A computer implemented method for correlating an incident service ticket with an incident resource ticket comprising:
    in response to a creation of an incident service ticket in a certain service category; performing a first search searching with a data processor for open incident resource tickets of the same or similar category;
    performing a second search searching with the data processor based on a set of similarity roles for corresponding critical configuration items defined in business service configuration items; and
    when both the first and second searches succeed, performing a third search searching with the data processor of found open incident resource tickets from the first search ordered by time using found corresponding critical configuration items from the second search and, when a match is found, declaring the incident service ticket to be correlated with the matching incident resource ticket.

2. The method of claim 1, where when performance of either the first search or the second search does searches do not succeed, or when a match is not found during performance of the third search, obtaining input from a dependency tree for the business service configuration items and when no related service configuration items for the service category are identified from the dependency tree then concluding the performance of the method, otherwise when at least one related service configuration item for the service category is identified from the dependency tree performing a fourth search searching with the data processor of found incident resource tickets ordered by time using any found related service configuration items.

3. The method of claim 2, where when no associated resource tickets are found during performance of the fourth search available further comprising performing probing of resources determined from the dependency tree to attempt to generate at least one corresponding resource ticket, and searching on any corresponding resource tickets that are generated for related configuration items.

4. The method of claim 3, where the probing is adaptive probing constrained to execute in some predetermined period of time with a restriction on a number of probes that can be executed in parallel.

5. The method of claim 1, where information is stored as values of attributes resCategory and servCategory of resource tickets and service tickets, respectively, and can be matched using similarity rules in a service definition.

6. The method of claim 5, where critical configuration items are searched using a value of an attribute customerID contained in the service ticket and a service category of the service definition.

7. The method of claim 1, where characterization of service to resource associations is determined during service design, and where association of a service instance to a specific resource or resources is made during service instantiation based on historical data or prior knowledge as reflected in the critical configuration items.

8. The method of claim 1, further comprising updating critical configuration item information based on historical information.

9. The method of claim 2, where the dependency tree comprises monitored system topology modeled by configuration management database relationships.

10. The method of claim 1, performed as a result of execution of computer program instructions stored in at least one non-transitory computer-readable storage medium by at least one data processor.

11. A system configured to correlate an incident service ticket with an incident resource ticket comprising:
    at least one computer-readable storage medium storing computer program instructions; and
    at least one data processor readably coupled to the at least one computer-readable storage medium, where execution of the computer program instructions by the at least one data processor causes the at least one data processor, in response to a creation of an incident service ticket in a certain service category;
    perform a first search for open incident resource tickets of the same or similar category, perform a second search based on a set of similarity rules for corresponding critical configuration items defined in business service configuration items and, when both the first and second searches succeed, to perform a third search of found open incident resource tickets from the first search ordered by time using found corresponding critical configuration items from the second search and, when a match is found, to declare the incident service ticket to be correlated with the matching incident resource ticket.

12. The system of claim 11, where when performance of either the first search or the second search does searches lo not succeed, or when a match is not found during performance of the third search, the at least one data processor is configured to obtain input from a dependency tree for the business service configuration items and when no related service configuration items for the service category are identified from the dependency tree to conclude attempting to correlate the service ticket, otherwise when at least one related service configuration item for the service category is identified from the dependency tree to perform a fourth of search found incident resource tickets ordered by time using any found related service configuration items.

13. The system of claim 12, where when no associated resource tickets are found during performance of the fourth search available the at least one data processor is configured to perform probing of resources determined from the dependency tree to attempt to generate at least one corresponding resource ticket, and to search on any corresponding resource tickets that are generated for related configuration items.

14. The system of claim 13, where the probing is adaptive probing constrained to execute in some predetermined period of time with a restriction on a number of probes that can be executed in parallel.

15. The system of claim 11, where information is stored as values of attributes resCategory and servCategory of resource tickets and service tickets, respectively, and can be matched using similarity rules in a service definition.

16. The system of claim 15, where critical configuration items are searched using a value of an attribute customerID contained in the service ticket and a service category of the service definition.

17. The system of claim 11, where characterization of service to resource associations is determined during service design, and where association of a service instance to a specific resource or resources is made during service instantiation based on historical data or prior knowledge as reflected in the critical configuration items.

18. The system of claim 11, where the at least one data processor is configured to update critical configuration item information based on historical information.

19. The system of claim 12, where the dependency tree comprises monitored system topology modeled by configuration management database relationships.

20. A non-transitory computer-readable storage medium containing program instructions that, when executed by at least one data processor, result in performing operations to correlate an incident service ticket with an incident resource ticket, the operations comprising:
in response to a creation of an incident service ticket in a certain service category;
performing a first search searching for open incident resource tickets of the same or similar category;
performing a second search searching based on a set of similarity rules for corresponding critical configuration items defined in business service configuration items; and
when both the first and second searches succeed, performing a third search of searching of found open incident resource tickets from the first search ordered by time using found corresponding critical configuration items from the second search and, when a match is found, declaring the incident service ticket to be correlated with the matching incident resource ticket.

21. The non-transitory computer-readable storage medium of claim 20, where when performance of either the first search or the second search does both searches do not succeed, or when a match is not found during performance of the third search, obtaining input from a dependency tree for the business service configuration items and when no related service configuration items for the service category are identified from the dependency tree then concluding the operations, otherwise when at least one related service configuration item for the service category is identified from the dependency tree performing a fourth search of searching found incident resource tickets ordered by time using any found related service configuration items, where the dependency tree comprises monitored system topology modeled by configuration management database relationships.

22. The non-transitory computer-readable storage medium of claim 21, where when no associated resource tickets are found during performance of the fourth search available further performing probing of resources determined from the dependency tree to attempt to generate at least one corresponding resource ticket, and searching on any corresponding resource tickets that are generated for related configuration items, where the probing is adaptive probing constrained to execute in some predetermined period of time with a restriction on a number of probes that can be executed in parallel.

23. The non-transitory computer-readable storage medium of claim 20, where information is stored as values of attributes resCategory and servCategory of resource tickets and service tickets, respectively, and can be matched using similarity rules in a service definition, where critical configuration items are searched using a value of an attribute customerID contained in the service ticket and a service category of the service definition.

24. The non-transitory computer-readable storage medium of claim 20, where characterization of service to resource associations is determined during service design, and where association of a service instance to a specific resource or resources is made during service instantiation based on historical data or prior knowledge as reflected in the critical configuration items.

25. The non-transitory computer-readable storage medium of claim 20, further comprising an operation of updating critical configuration item information based on historical information.

* * * * *